United States Patent
Philippe et al.

(10) Patent No.: US 8,221,836 B2
(45) Date of Patent: Jul. 17, 2012

(54) METHOD OF FABRICATING A THERMOSTRUCTURAL COMPOSITE MATERIAL PART, AND A PART OBTAINED THEREBY

(75) Inventors: Eric Philippe, Merignac (FR); Eric Bouillon, Le Haillan (FR)

(73) Assignee: Snecma Propulsion Solide, Le Haillan (FR)

( * ) Notice: Subject to any disclaimer, the term of this patent is extended or adjusted under 35 U.S.C. 154(b) by 0 days.

(21) Appl. No.: 12/501,648

(22) Filed: Jul. 13, 2009

(65) Prior Publication Data

US 2010/0015428 A1    Jan. 21, 2010

(30) Foreign Application Priority Data

Jul. 21, 2008   (FR) ..................................... 08 54937

(51) Int. Cl.
  *C23C 16/00* (2006.01)
(52) U.S. Cl. ................. 427/249.2; 427/255.12; 427/900
(58) Field of Classification Search ................ 427/249.2, 427/255.12, 900
  See application file for complete search history.

(56) References Cited

U.S. PATENT DOCUMENTS 5,486,379 A * 1/1996 Bouillon et al. ............... 427/212
5,738,951 A   4/1998 Goujard et al.
2008/0299385 A1 * 12/2008 Philippe et al. ............... 428/336

FOREIGN PATENT DOCUMENTS

| CA | 2038859 | 10/1991 |
| EP | 0451043 | 10/1991 |
| FR | 2882356 | * 8/2006 |

* cited by examiner

*Primary Examiner* — Elizabeth Burkhart
(74) *Attorney, Agent, or Firm* — Weingarten, Schurgin, Gagnebin & Lebovici LLP

(57) ABSTRACT

The method comprises:
  using chemical vapor infiltration to form a first continuous interphase on the fibers of a fiber structure made of refractory fibers, the interphase having a thickness of no more than 100 nanometers;
  impregnating the fiber structure with a consolidation composition comprising a carbon or ceramic precursor resin;
  forming a fiber preform that is consolidated by shaping the impregnated fiber structure and using pyrolysis to transform the resin into a discontinuous solid residue of carbon or ceramic;
  using chemical vapor infiltration to form a second continuous interphase layer; and
  densifying the preform with a refractory matrix.

This preserves the capacity of the fiber structure to deform so as to enable a fiber preform to be obtained that is of complex shape, while nevertheless guaranteeing the presence of a continuous interphase between the fibers and the matrix.

10 Claims, 2 Drawing Sheets

METHOD OF FABRICATING A THERMOSTRUCTURAL COMPOSITE MATERIAL PART, AND A PART OBTAINED THEREBY

BACKGROUND OF THE INVENTION

The invention relates to fabricating parts made of thermostructural composite material. A field of application for the invention is that of making structural parts for engines or thruster assemblies used in the fields of aviation and space.

Thermostructural composite materials are remarkable for their mechanical properties and for their ability to conserve these mechanical properties at high temperatures.

Well-known thermostructural composite materials are carbon/carbon (C/C) composite materials comprising carbon fiber reinforcement densified by a carbon matrix, and ceramic matrix composite (CMC) materials comprising fiber reinforcement made of refractory fibers (carbon or ceramic fibers) densified by a ceramic matrix or by a matrix that is essentially ceramic.

In a CMC material, it is well known that the presence of an embrittlement-relief interphase interposed between the fibers of the fiber reinforcement and the matrix greatly diminishes the sensitivity of the material to cracking and increases its ability to withstand impacts. The interphase is made of a material that is capable of relieving stresses at the bottoms of cracks that propagate through the matrix to the interphase, and that is thus capable of avoiding or delaying propagation of the cracks through the fibers. Such propagation of cracks through the fibers causes them to break, so preventing it makes the CMC material less fragile. The material constituting the interphase may be constituted for example by pyrolytic carbon (PyC) or boron nitride (BN) that is deposited on the fibers of the fiber reinforcement by chemical vapor infiltration (CVI), as described in particular in document U.S. Pat. No. 4,752,503. Another material that is suitable for an embrittlement-relief interphase is boron-doped carbon (BC).

In a C/C material, the presence of an interphase between the fibers of the fiber reinforcement and the carbon matrix, the interphase being of a material other than carbon, can also be useful in particular for improving oxidation behavior, e.g. if use is made of a boron-containing interphase, such as BN or BC.

Furthermore, in order to make a thermostructural composite material part that is complex in shape, it is known to begin by making a fiber preform that is to constitute the fiber reinforcement of the part by shaping a fiber structure and by keeping it in the desired shape by consolidation. Consolidation consists in densifying the fiber preform in part by means of a consolidating matrix phase, with this partial densification being performed so as to be sufficient, and preferably only just sufficient, to ensure that the preform can be handled while conserving its shape without assistance from support tooling. This enables densification of the consolidated preform to be continued without requiring tooling, and that is particularly advantageous, in particular when densification is continued by CVI in an oven, where otherwise the tooling would occupy a major fraction of the useful volume of the oven.

The fiber preform may be consolidated by CVI. The preform, while being held in the desired shape by tooling, is then placed in an oven where it is possible successively to form an interphase coating on the fibers and to consolidate them by partial densification. However, that returns to the above-mentioned drawback of tooling occupying useful space in the oven. In addition, and as is well known, CVI processes are lengthy, even for densification that is only partial.

It is therefore advantageous to perform consolidation by a liquid technique, that involves shaping the fiber preform from a fiber texture that has been impregnated with a liquid consolidation composition containing a resin that is a precursor of the carbon or ceramic consolidating matrix phase, the resin subsequently being transformed into a solid carbon or ceramic residue by pyrolysis. Nevertheless, prior formation on the fibers of the fiber texture of an interphase coating presenting sufficient thickness to perform the embrittlement-relief function has detrimental consequences on the ability of the fiber structure to be deformed, and that can make it impossible to put the fiber preform into the desired shape, particularly when the part that is to be made is of a shape that is relatively complex.

To solve that difficulty, proposals are made in document U.S. Pat. No. 5,486,379 to put an interphase into place after the fiber preform has been consolidated by a liquid technique and prior to continuing densification. Nevertheless, because of the presence of the consolidating phase, it is not possible to guarantee that the interphase will be formed continuously on the fibers of the fiber preform, in particular when the solid residue of pyrolyzing the consolidating resin adheres strongly to the fibers, as happens for example with the residue of pyrolyzing a resin that is a precursor of silicon carbide (SiC) on SiC fibers.

OBJECTS AND SUMMARY OF THE INVENTION

An object of the invention is to provide a method enabling a thermostructural composite material part to be made that is capable of being complex in shape, by shaping and consolidating a fiber preform using a liquid technique, while ensuring that a continuous interphase is present between the fibers and the matrix.

This object is achieved by a method comprising the following successive steps:

using chemical vapor infiltration to form a first continuous interphase layer on the fibers of a fiber structure made of refractory fibers, the first interphase layer having a thickness of no more than 100 nanometers;

forming a consolidated fiber preform by shaping the fiber structure provided with the first interphase layer and impregnated with a consolidation composition that includes a carbon or ceramic precursor resin;

transforming the resin by pyrolysis into a discontinuous solid residue formed of grains of carbon or ceramic;

then using chemical vapor infiltration to form a second continuous interphase layer covering the first interphase layer and the solid pyrolysis residue grains; and then densifying the preform with a refractory matrix.

This guarantees that a continuous and sufficient interphase is present between the fibers and the matrix, while nevertheless ensuring that the fiber structure from which the preform is to be made conserves its ability to be deformed.

Preferably, the first interphase layer is made of a material selected from pyrolytic carbon, boron nitride, and boron-doped carbon. The same may apply for the second interphase layer, and the materials of the first and second interphase layers not necessarily being the same. In a variant, the second interphase layer may be made in a sequenced form by alternating embrittlement-relief layers, e.g. of PyC, BN, or BC, with ceramic layers, e.g. of SiC. The fabrication of sequenced interphases is described in particular in document U.S. Pat. No. 5,738,951.

Advantageously, the first interphase layer has thickness of no more than 50 nanometers.

Preferably, the first interphase layer has thickness of at least 10 nanometers.

The thickness of the second interphase layer is preferably not less than 100 nanometers.

In a particular implementation of the method, the operations of transforming the resin into a solid residue of carbon or ceramic by pyrolysis, and of forming the second interphase layer are performed sequentially in a same oven.

The invention also provides a thermostructural composite material part as can be obtained by the above method.

According to the invention, such a part comprising fiber reinforcement of refractory fibers densified by a refractory matrix obtained by chemical vapor infiltration, with an interphase being interposed between the fibers of the fiber reinforcement and the matrix, has an interphase that comprises a first continuous interphase layer coating the fibers of the fiber reinforcement and having a thickness of no more than 100 nanometers, and a second continuous interphase layer, the second interphase layer covering the first interphase layer and discontinuous grains of a solid carbon or ceramic residue that results from pyrolyzing a resin, which grains are interposed between the first and second interphase layers.

Preferably, the first interphase layer is made of a material selected from pyrolytic carbon (PyC), boron nitride (BN), and boron-doped carbon (BC). The second interphase layer may also be made of a material selected from PyC, BN, and BC, with the materials of the two interphase layers not necessarily being the same. In a variant, the second interphase may be a sequenced interphase made by a succession of layers alternating between an embrittlement-relief material, e.g. PyC, BN, or BC, and a ceramic material, e.g. SiC.

The first interphase layer may have thickness of no more than 50 nanometers, and preferably has a thickness of at least 10 nanometers, while the second interphase layer has a thickness that is preferably not less than 100 nanometers.

The composite material part may in particular be a CMC material part, with the grains of solid residue of pyrolysis and the matrix being made of ceramic.

BRIEF DESCRIPTION OF THE DRAWINGS

The invention can be better understood on reading the following description made by way of non-limiting indication and with reference to the accompanying drawings, in which.

DETAILED DESCRIPTION OF EMBODIMENTS

Figure 1:
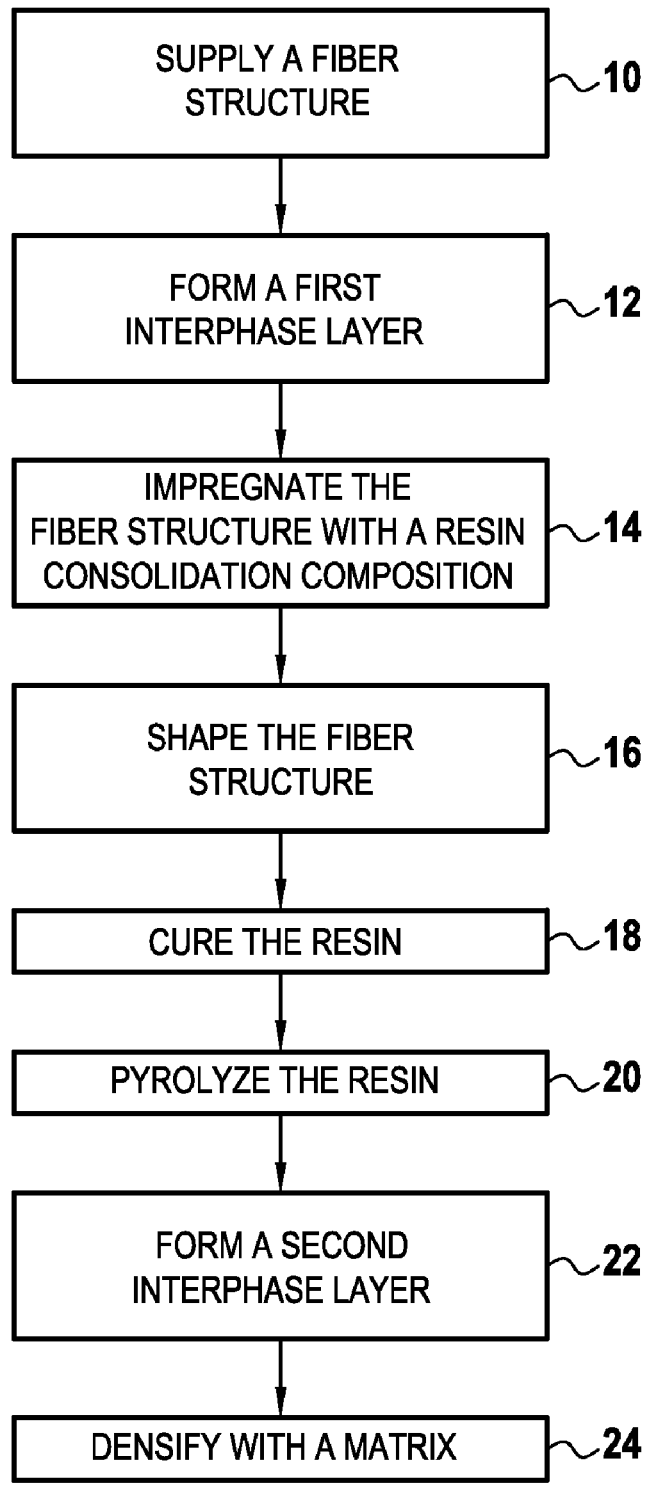
FIG. 1 shows the successive steps in an implementation of a method in accordance with the invention.

A first step (10) of the method consists in providing a fiber structure from which a fiber preform is to be made that is suitable for making a composite material of given shape. The fiber structure may be of various forms, such as:

a two-dimensional (2D) fabric;
a three-dimensional (3D) fabric obtained by 3D weaving or multilayer weaving;
a braid;
a knit;
a felt; and
a unidirectional (UD) sheet of yarns or tows, or a multidirectional (nD) sheet obtained by superposing a plurality of UD sheets in different directions and bonding the UD sheets together, e.g. by stitching, by a chemical bonding agent, or by needling.

It is also possible to use a fiber structure made up of a plurality of superposed layers of fabric, braiding, knitting, felt, sheets, etc., which layers are bonded together, e.g. by stitching, by implanting yarns or rigid elements, or by needling.

The fibers constituting the fiber structure are refractory fibers, i.e. fibers made of ceramic, for example of silicon carbide (SiC), carbon fibers, or indeed fibers of a refractory oxide, e.g. of alumina ($Al_2O_3$).

In step 12, a first interphase layer of small thickness is formed on the fibers of the fiber structure. In order to preserve the deformability of the fiber structure, the thickness of the first interphase layer is selected to be no more than 100 nanometers (nm), and preferably no more than 50 nm. In order to preserve the function of the first interphase layer as described in detail below, its thickness is preferably not less than 10 nm.

The material of the first interphase layer is advantageously selected from pyrolytic carbon (PyC), boron nitride (BN), and boron-doped carbon (BC). The first interphase layer is formed by chemical vapor infiltration (CVI). CVI processes for forming a deposit of PyC, BN, or BC are known. For depositing PyC or BN, reference can be made to above-mentioned document U.S. Pat. No. 4,752,503. For CVI deposition of BC, i.e. a system comprising about 5% to 20% B with the balance being C, it is possible to use a reactive gas containing a mixture of: boron tricholoride ($BCl_3$), a precursor of B; propane ($C_3H_8$), a precursor of C; and hydrogen gas ($H_2$) forming a reducing agent and a diluting gas, as described in particular in document U.S. Pat. No. 6,068,930.

After the first interphase layer has been formed, the fiber structure is impregnated (step 14) with a liquid composition containing a consolidating resin that is a carbon or ceramic precursor. For this purpose, the fiber structure is immersed in a bath containing the resin and usually a solvent therefor. After draining, drying is performed in a stove. The drying may be accompanied by pre-curing or partial curing of the resin. Since such pre-curing provides additional stiffness, if it is performed at all it needs to remain limited so as to preserve sufficient deformability for the fiber structure on which the first interphase layer has already been formed.

Other known impregnating techniques could be used, such as preparing a pre-impregnated blank by passing the fiber structure through a continuous impregnator, infusion impregnation, or indeed impregnation by resin transfer molding (RTM).

The consolidation resin is selected to ensure that after pyrolysis it leaves a residue of carbon or ceramic that is sufficient to consolidate the subsequently-made fiber preform.

A carbon-precursor resin may be selected from phenolic resins and epoxy resins.

A ceramic-precursor resin may for example be: a polycarbosilane resin, a precursor for silicon carbide (SiC); or a polysiloxane, a precursor for SiCO; or a polyborocarbosilazane resin, a precursor for SiCNB.

After impregnation, a fiber preform for constituting the fiber reinforcement of the part that is to be made, and having a shape that corresponds substantially to the shape of said part, is obtained by shaping the fiber structure with the help of support tooling (step 16).

The shaping of the fiber structure may include operations of draping the fiber structure or plies or panels that have been cut out from the fiber structure. The cuts or incisions may be made so as to facilitate draping where a relatively large amount of deformation is needed.

The shaping of the fiber structure may also include operations of folding portions of the fiber structure, e.g. portions situated on either side of unbending zones formed while making the fiber structure or on either side of cuts made through the fiber structure.

The support tooling may be constituted by a rigid mold and a mold cover, between which the fiber preform is shaped.

The support tooling may also be constituted by a mandrel or a former and a possibly flexible outer jacket, with the fiber structure or the fiber structure plies being shaped by being draped on the mandrel prior to applying the outer jacket.

The shaping of the fiber preform may be accompanied by compression of the fiber structure so as to obtain a relatively high volume fraction for the fibers in the composite material of the part that is to be made, should that be desired.

After the preform has been shaped, the resin is cured, or resin curing is completed if it is has been pre-cured (step 18), with the preform remaining in the support tooling.

Thereafter, heat treatment is performed to pyrolyze the resin (step 20).

Pyrolysis is performed at a temperature of about 900° C. to 1000° C., for example. Advantageously, after the preform that has been consolidated by the cured resin has been extracted from the support tooling, pyrolysis is performed in the oven that is used for forming the second interphase layer when said layer is obtained by CVI (as described below), during the temperature rise that precedes actually forming said second interphase layer.

In step 22, a second interphase layer is formed on the consolidated fiber preform, the second interphase layer covering the first interphase layer and the discontinuous solid residue of carbon or ceramic grains that result from pyrolyzing the resin.

In order to perform the looked-for function, the second interphase layer has a thickness that is preferably not less than 100 nm.

The material of the second interphase layer may be selected from PyC, BN, and BC, it being understood that it may differ from the material of the first interphase layer. In a variant, a second interphase layer may be formed that is sequenced, by alternating deposition of individual layers of embrittlement-relief layers such as PyC, BN, or BC, and deposition of individual layers of ceramic material such as SiC, each individual layer being of very small thickness, e.g. less than 10 nm, as described in above-mentioned document U.S. Pat. No. 5,738,951. The second interphase layer is formed by CVI.

After the second interphase layer has been formed, the densification of the fiber preform with a matrix is continued (step 24).

Densification is advantageously performed by CVI, preferably running on from forming the second interphase layer, with the parameters of the CVI process and the nature of the reaction gas being adapted to the nature of the matrix that is to be formed. It is thus possible to use the same oven to perform in sequence the operations of pyrolyzing the consolidation resin, forming the second interphase layer, and densification.

In a variant, densification could be performed using a liquid technique, i.e. impregnating the preform with a liquid composition containing a precursor for the matrix that is to be formed, typically a ceramic or carbon precursor resin. Impregnation is followed by curing the resin and pyrolysis in order to obtain the desired carbon or ceramic residue, with the impregnation, curing, and pyrolysis cycle possibly being repeated several times.

The matrix formed by CVI may be a ceramic matrix, e.g. an SiC matrix, or it may be a matrix that is at least partially self-healing, such as a silicon-boron-carbon (Si—B—C) matrix or a boron carbide ($B_4C$) matrix, or indeed a sequenced matrix having alternating matrix phases of non-healing ceramic and of healing ceramic. Reference can be made in particular to the following documents: FR 2 401 888; U.S. Pat. No. 5,246,736; U.S. Pat. No. 5,965,266; U.S. Pat. No. 6,068,930; and U.S. Pat. No. 6,291,058.

The matrix formed by CVI may be a carbon matrix, with the making of a carbon matrix by CVI being well known.

Figure 2:
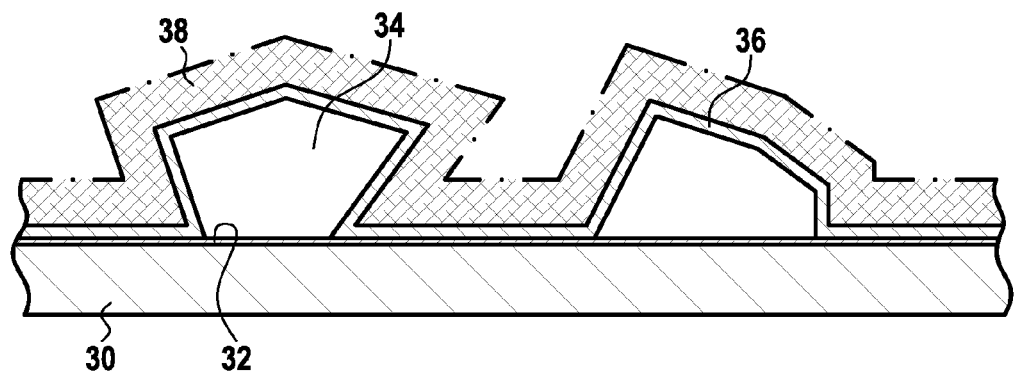
FIG. 2 is a highly diagrammatic view showing the formation of an interphase and a matrix on a fiber in a composite material part obtained in accordance with the invention.

As shown very diagrammatically in FIG. 2, a composite material part is thus obtained in which each fiber 30 is coated continuously in a first continuous interphase layer 32 of relatively small thickness, with the grains of carbon or ceramic that form the discontinuous consolidating phase 34 as constituted by the solid residue of pyrolyzing the consolidating resin being interposed between the first interphase layer 32 and the second continuous interphase layer 36. The matrix 38 obtained by CVI covers the second interphase layer.

When the fibers 10 and the consolidating phase 34 are made of ceramic, the first interphase layer 32 serves to avoid the consolidating phase adhering too strongly to the fibers, since that can embrittle the composite material, particularly with a consolidating phase and fibers that are made of SiC.

When the fibers 10 are carbon fibers and the consolidating phase 34 is made of ceramic or carbon, the first interphase layer 32 facilitates anchoring the consolidating phase on the fibers.

The thickness of the second interphase layer 36 is not less than 100 nm, but above that it may be greater or smaller depending on the nature of the matrix 38.

Thus, with ceramic fibers, in particular SiC fibers, and a ceramic matrix that is not healing (e.g. SiC) or that is healing, a second interphase layer having a thickness lying in the range 100 nm to a few hundreds of nm may suffice to ensure the desired embrittlement-relief function.

With fibers made of carbon and a ceramic matrix that is non-healing or healing, the thickness of the second interphase layer 36 may reach or even exceed 1 micrometer (μm), with the looked-for function likewise being an embrittlement-relief function.

For carbon fibers with a carbon matrix, the thickness of the second interphase layer 36 may reach or exceed 1 μm. The function of the second interphase layer may be to improve the oxidation behavior of the composite material, in which case the second interphase layer is preferably made of BN or BC or is in a sequenced form, repeating the sequence BN/SiC or BC/SiC n times (where n is not less than 2).

Example 1 (In Accordance with the Invention)

A composite material part was made as follows:
making a woven multilayer fiber structure out of SiC fibers provided by the Japanese supplier Nippon Carbon under the name "Nicalon";
using CVI to form a first interphase layer of PyC to a thickness of about 50 nm;
impregnating the fiber structure with a polysiloxane resin in solution in methyl-ethyl-ketone;
drying (without pre-curing);
making a fiber preform by draping a plurality of plies of impregnated fiber structure on a support and covering in a vacuum pouch;

curing the resin in a vacuum within the tooling formed by the support and the vacuum pouch, to obtain a consolidated preform; and removing the consolidated preform from the tooling and pyrolyzing the resin at about 1000° C., pyrolysis being performed in a CVI densification oven in which the following steps were performed in sequence:

using CVI to form a second interphase layer out of BC, to a thickness equal to about 200 nm; and using CVI to densify with a self-healing ceramic matrix of the Si—B—C type.

Example 2 (For Comparison)

The procedure was the same as in Example 1, but the second interphase layer was not made.

Example 3 (For Comparison)

The procedure was the same as in Example 1, but using a first interphase layer with a thickness of about 150 nm and without forming a second interphase layer.

In Example 1, it was found that the impregnated fiber texture presented good capacity for deformation, even though that capacity was not used in order to make a comparison with Example 3.

Samples of composite material parts obtained in accordance with Examples 1, 2, and 3 were subjected to traction testing.

Figure 3:
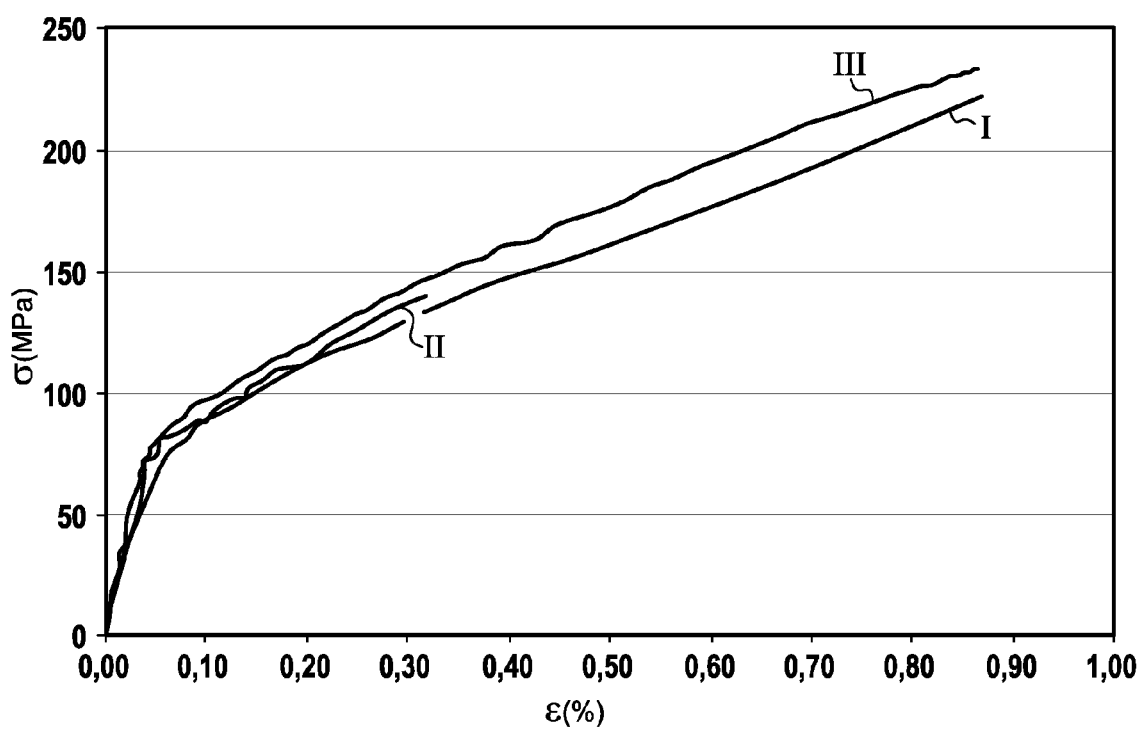
FIG. 3 plots curves showing the elongation behavior of samples of composite material obtained in accordance with the invention and in accordance with the prior art.

Curves I, II, and III in FIG. 3 show the relationship between the applied stress σ and the relative elongation ε measured up to break.

It can be seen that the materials of Examples I and III have substantially the same mechanical behavior, whereas the material of Example II is particularly fragile.

Thus, while preserving the possibility of making fiber preforms for composite material parts that are complex in shape, by making use of consolidation by a liquid technique, the method of the invention makes it possible to preserve non-brittle behavior for the material.

What is claimed is:

1. A method of fabricating a thermostructural composite material part, the method comprising the following successive steps:

using chemical vapor infiltration to form a first continuous interphase layer of a single material on the fibers of a fiber structure made of refractory fibers, the first interphase layer having a thickness of no more than 100 nanometers;

forming a consolidated fiber preform by shaping the fiber structure, with the first interphase layer and impregnated with a consolidation composition that includes a carbon or ceramic precursor resin, into a desired shape;

transforming the resin by pyrolysis into a discontinuous solid residue formed by grains of carbon or ceramic;

then using chemical vapor infiltration to form a second continuous interphase layer covering the first interphase layer and the solid pyrolysis residue grains; and then densifying the preform with a refractory matrix.

2. A method according to claim 1, wherein the first interphase layer is made of a single material selected from pyrolytic carbon, boron nitride, and boron-doped carbon.

3. A method according to claim 1, wherein the material of the second interphase layer is selected from pyrolytic carbon, boron nitride, boron-doped carbon, and a material made up of layers of pyrolytic carbon, boron nitride, or boron-doped carbon alternating with layers of silicon carbide.

4. A method according to claim 1, wherein the first interphase layer has thickness of no more than 50 nanometers.

5. A method according to claim 1, wherein the first interphase layer has thickness of at least 10 nanometers.

6. A method according to claim 1, wherein the second interphase layer has a thickness of at least 100 nanometers.

7. A method according to claim 1, wherein the operations of transformation into a solid residue of carbon or ceramic by pyrolysis, and of forming the second interphase layer are performed sequentially in a same oven.

8. The method according to claim 1, wherein said shaping of the fiber structure into the desired shape is carried out by using a tooling to maintain the fiber structure in the desired shape.

9. The method according to claim 8, wherein the second continuous interphase layer is formed after the consolidated preform has been removed from said tooling.

10. The method according to claim 1, wherein said first and second contiguous interphase layers together form an embrittlement relief interphase between the fibers and the refractory matrix.

* * * * *